US008915075B2

(12) United States Patent
Keyl et al.

(10) Patent No.: US 8,915,075 B2
(45) Date of Patent: Dec. 23, 2014

(54) HYDRAULIC CONTROL ARRANGEMENT

(75) Inventors: Christoph Keyl, Stuttgart (DE); Vincenzo Domenico Bollero, Rivarolo Canavese (IT)

(73) Assignee: Robert Bosch GmbH, Stuttgart (DE)

( * ) Notice: Subject to any disclaimer, the term of this patent is extended or adjusted under 35 U.S.C. 154(b) by 1363 days.

(21) Appl. No.: 12/532,973

(22) PCT Filed: Mar. 20, 2008

(86) PCT No.: PCT/DE2008/000491
§ 371 (c)(1), (2), (4) Date: Mar. 23, 2010

(87) PCT Pub. No.: WO2008/116451
PCT Pub. Date: Oct. 2, 2008

(65) Prior Publication Data

US 2010/0212308 A1 Aug. 26, 2010

(30) Foreign Application Priority Data

Mar. 27, 2007 (DE) ......................... 10 2007 014 673
Jun. 22, 2007 (DE) ......................... 10 2007 028 864

(51) Int. Cl.
*F16D 31/02* (2006.01)
*F15B 11/16* (2006.01)
*F15B 11/00* (2006.01)

(52) U.S. Cl.
CPC ..... *F15B 11/163* (2013.01); *F15B 2211/50545* (2013.01); *F15B 11/003* (2013.01)
USPC .................................. 60/422; 60/426; 91/516

(58) Field of Classification Search
CPC ................. F15B 11/163; F15B 11/003; F15B 2211/455; F15B 2211/40569; F15B 2211/50545; B66F 9/22
USPC ....................... 60/422, 426, 461, 466; 91/516
See application file for complete search history.

(56) References Cited

U.S. PATENT DOCUMENTS

| | | | | |
|---|---|---|---|---|
| 4,617,854 | A | 10/1986 | Kropp | |
| 5,115,720 | A * | 5/1992 | Babson et al. | 91/448 |
| 5,271,227 | A * | 12/1993 | Akiyama et al. | 60/422 |
| 5,609,089 | A * | 3/1997 | Leidinger | 91/516 |
| 5,701,618 | A * | 12/1997 | Brugger | 5/611 |

(Continued)

FOREIGN PATENT DOCUMENTS

| | | | |
|---|---|---|---|
| DE | 9106442 | U1 | 8/1991 |
| DE | 19703997 | A1 | 8/1998 |
| DE | 10119276 | A1 | 10/2002 |

OTHER PUBLICATIONS

PCT/DE2008/000491 International Search Report.

(Continued)

*Primary Examiner* — Edward Look
*Assistant Examiner* — Michael Quandt
(74) *Attorney, Agent, or Firm* — Michael Best & Friedrich LLP

(57) ABSTRACT

The invention relates to a hydraulic control arrangement for a mobile machine tool, particularly for a forklift, comprising at least two hydraulic loads (10, 12), one of them having a lifting function. According to the invention, the two loads are each controlled via a LUDV valve with inflow measuring diaphragm (36, 44) and LUDV pressure regulator (46) connected downstream.

16 Claims, 4 Drawing Sheets

(56) References Cited

U.S. PATENT DOCUMENTS

| | | | | |
|---|---|---|---|---|
| 5,752,384 | A * | 5/1998 | Schmitt et al. | 60/426 |
| 5,896,943 | A * | 4/1999 | Christensen | 180/442 |
| 6,289,675 | B1 * | 9/2001 | Herfs et al. | 60/422 |
| 6,293,099 | B1 | 9/2001 | Kamiya | |
| 6,367,365 | B1 * | 4/2002 | Weickert et al. | 91/447 |
| 6,378,302 | B1 * | 4/2002 | Nozawa et al. | 60/422 |
| 6,438,952 | B1 * | 8/2002 | Nozawa et al. | 60/422 |
| 6,644,025 | B1 * | 11/2003 | Oberhäusser et al. | 60/422 |
| 6,658,843 | B1 * | 12/2003 | Kauss | 60/468 |
| 6,837,045 | B2 * | 1/2005 | Heusser | 60/403 |
| 6,931,847 | B1 * | 8/2005 | Throckmorton et al. | 60/422 |
| 7,181,910 | B2 * | 2/2007 | Nissen et al. | 60/414 |
| 7,600,612 | B2 * | 10/2009 | Passeri | 187/224 |
| 7,607,381 | B2 * | 10/2009 | Kauss et al. | 91/532 |
| 7,788,916 | B2 * | 9/2010 | Brockman et al. | 60/427 |
| 2006/0218914 | A1 * | 10/2006 | Kauss | 60/468 |
| 2006/0230753 | A1 | 10/2006 | Hesse et al. | |

OTHER PUBLICATIONS

Huzyak S., et al., "Flow sharing a step beyond load sensing," Hydraulics and Pneumatics, Dec. 1, 2003, Bd. 56, Nr. 12, pp. 35-38, Penton Media, Cleveland, OH.

* cited by examiner

HYDRAULIC CONTROL ARRANGEMENT

BACKGROUND OF THE INVENTION

The invention relates to a hydraulic control arrangement for a mobile machine comprising at least two hydraulic loads, one of them having a lifting function.

In U.S. Pat. No. 6,293,099 B1 a control arrangement is described which is provided for controlling the loads of a forklift. A forklift usually has a boom along which a fork is movable to lift or lower a load. The boom can moreover be tilted and laterally displaced, each of such functions being actuated via hydraulic cylinders. For controlling the pressure fluid volume flow to the respective hydraulic cylinder, in the known solution proportional valves are provided through which the pressure fluid volume flow to the respective hydraulic cylinder can be adjusted. Pressure fluid is usually supplied via an LS variable displacement pump or a constant displacement pump including a bypass pressure regulator. The variable displacement pump or the bypass pressure regulator can be controlled, in response to the maximum load pressure of all loads, so that the pump pressure is above the maximum load pressure by a predetermined $\Delta p$.

In such control arrangements a problem may arise when, for example, the empty unloaded fork is to be lifted and simultaneously the boom tilt is to be varied. In this case, the load pressure at the tilting cylinder is higher than the load pressure of the lifting cylinder so that the latter is preferably supplied with pressure fluid and the fork is lifted comparatively quickly, while the tilting motion is performed very slowly or is even stopped. This problem arises practically with all conventional forklifts.

It could be attempted to arrange in the pressure fluid flow path to the tilting cylinder an LS valve including metering orifice and pressure regulator to which the pressure upstream and downstream of the metering orifice is applied. In this case, lifting of the fork and tilting of the boom could be simultaneously performed, unless the maximum possible pump delivery is exceeded. In the case of undersupply, i.e. in case that the pump cannot deliver sufficient pressure fluid, the load having a higher load pressure slows down because the pump pressure prevailing upstream of the metering orifice thereof is dropped and thus the pressure difference above said metering orifice is reduced—the same problem as with the control arrangement including proportional valves is arising.

SUMMARY OF THE INVENTION

Compared to this, it is the object of the invention to provide a hydraulic control arrangement for a mobile machine in which plural loads can be simultaneously controlled.

In accordance with the invention, the at least two loads of the mobile machine are supplied with pressure fluid via a pump in response to the maximum load pressure. The pressure fluid volume flow to a load active in the lifting direction and the pressure fluid volume flow to another load are controlled via a respective LUDV valve including an inflow metering orifice and a pressure regulator connected downstream to which in the closing direction pressure corresponding approximately to the maximum load pressure of the loads and in the opening direction the pressure prevailing downstream of the inflow metering orifice is applied.

In such LUDV controls (load-pressure independent flow distribution) the LUDV pressure regulators arranged downstream of the metering orifice throttle the pressure fluid volume flow so strongly that the pressure downstream of all metering orifices is equal, preferably equal to the maximum load pressure, or slightly exceeds the latter. In the case of under-saturation, the pressure does not change downstream of the metering orifice. The pump pressure is applied upstream of all metering orifices in the same way so that the pressure difference changes at all metering orifices in the same way when the pump pressure is reduced in the case of under-saturation—in this way a proportional flow distribution of the delivery rate to the loads is ensured so that, for instance, also an unloaded fork of a forklift can be lifted and simultaneously a boom of the forklift can be tilted.

In a solution with a simple structure it may suffice when a further load is controlled by a proportional valve.

In an especially simply structured embodiment two loads which are provided, for instance, for tilting and for displacing a boom of a forklift are allocated to a metering orifice and an LUDV pressure regulator.

The flow direction of the pressure fluid to and from the load is controlled via a respective directional valve. That is to say, in this solution the metering orifices of the LUDV valves have a very simple design and are continuously adjustable in one direction so that the circuit can be realized in a very inexpensive manner.

In the event that the operating pressure of the loads controlled by a joint LUDV valve is lower than the operating pressure of the other loads, a pressure relief valve may be allocated to the pressure regulator of the joint LUDV valve.

The hydraulic actuation of a steering of the mobile machine is preferably performed via an LS valve including an inflow metering orifice and a steering pressure regulator.

In a variant, the pressure prevailing upstream of the allocated inflow metering orifice is applied to the steering pressure regulator in the closing direction and a spring and the pressure prevailing in the control line are applied in the opening direction. This control line is connected to a line portion guiding the load pressure of the steering.

It is preferred when a line portion located downstream of the steering pressure regulator is connected via a control passage and a check valve closing in the direction of the steering to an LS line conveying the maximum load pressure of the loads.

In an alternative solution, the control line (118) leads from a pressure fluid flow path upstream of the steering pressure regulator (112) to a line portion guiding the load pressure of the steering, two nozzles (120, 122) being arranged in the control line (118) and in the area between the two nozzles (120, 122) a control passage (124) leading to a control chamber active in the opening direction of the steering pressure regulator (112) branching off which is connected to an LS line (60) conveying the maximum load pressure via a check valve (126).

The control arrangement can be realized in an especially simple manner when the pressure fluid supply pump is a constant displacement pump with an allocated bypass pressure regulator which is pressurized by the pump pressure in the opening direction and by the maximum load pressure of the loads in the closing direction.

For pressure relief the LS line can be connected to a tank via a relief valve which is in the form of a flow control valve.

To protect the LS line an LS pressure relief valve may be provided in the same.

The control arrangement according to the invention is preferably used for controlling a forklift, wherein an LUDV valve for controlling the lifting function and an LUDV valve for controlling the tilting and lateral displacement of a boom of the forklift are provided.

BRIEF DESCRIPTION OF THE DRAWINGS

Hereinafter preferred embodiments of the invention will be illustrated by way of schematic drawings, in which.

DETAILED DESCRIPTION

Figure 1:
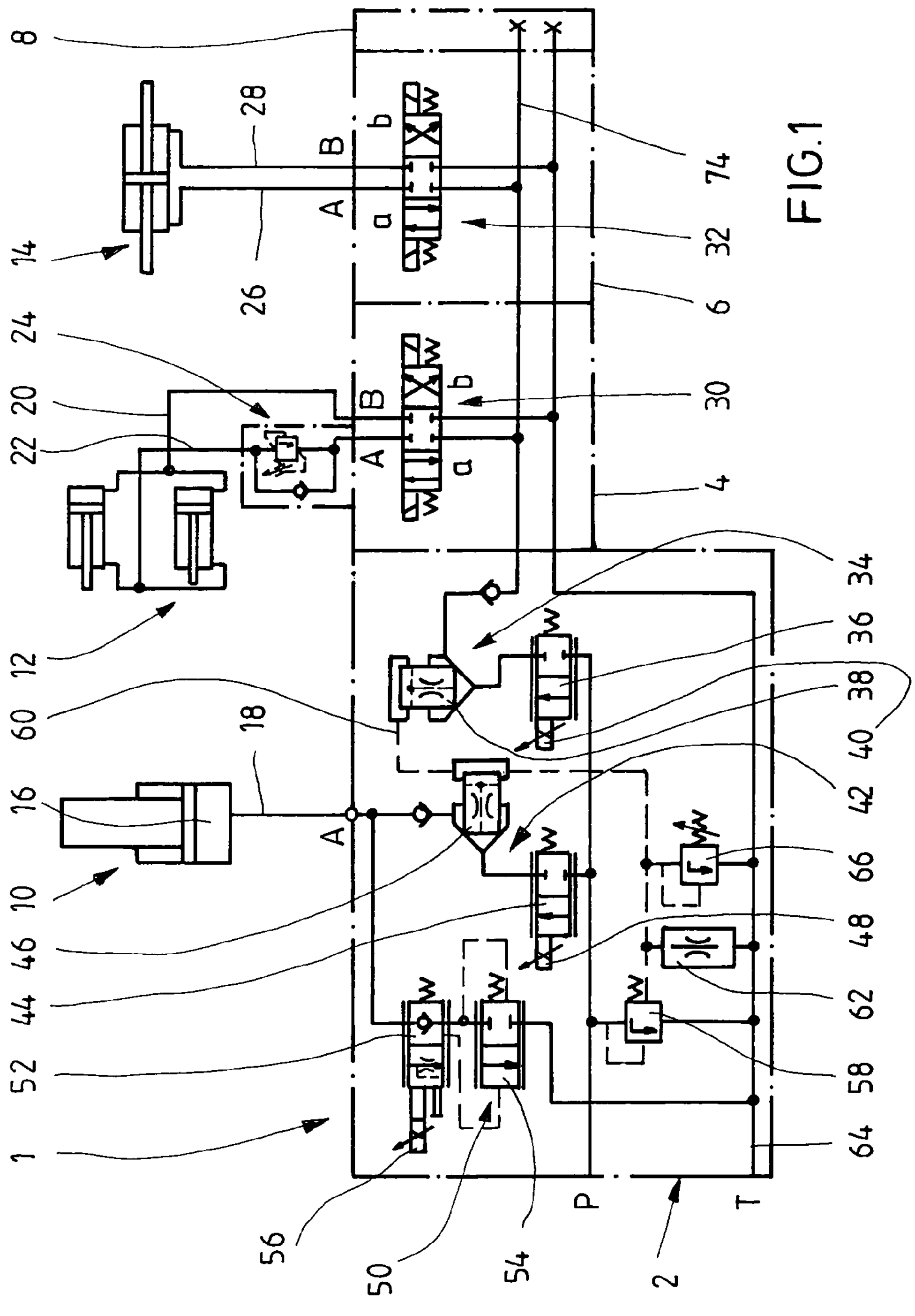
FIG. 1 shows a circuit diagram of a control arrangement of a forklift having a lifting function, a tilting function and a displacement function.

In FIG. 1 a circuit diagram of a hydraulic control arrangement of a forklift is shown. This control arrangement is formed, for instance, by a mobile control block 1 which substantially consists of an LUDV section 2, two directional valve sections 4, 6 and an end plate 8. In the shown embodiment the mobile control block 1 comprises a pressure port P, a tank port T and a working port A at the LUDV section 2 and respective working ports A, B at the two directional valve sections 4, 6. The shown mobile control block 1 is provided for controlling a boom and the fork of the forklift, wherein the fork can be lifted or lowered via a lifting cylinder 10. A tilting cylinder 12 is provided for tilting the boom guiding the fork and a displacement cylinder 14 for laterally displacing the boom. The lifting cylinder 10 is a differential cylinder, a bottom-side cylinder chamber 16 being connected to the working port A of the LUDV section 2 via an operating line 18. The tilting cylinder 12 is a double cylinder having two differential cylinders connected in parallel, the bottom-side cylinder chambers being connected via a load line 20 and the two piston rod-side annular chambers being connected via another load line 22 to the working ports B and A, respectively, of the directional valve section 4.

In the further load line 22 a lowering brake valve 24 is arranged which freely admits pressure fluid supply from the working port A to the two annular chambers and throttles the backflow from the two annular chambers to the working port A so that a controlled tilting of the boom is permitted. Such lowering brake valves or counter-balance valves are known from prior art so that any further explanations can be dispensed with.

The displacement cylinder 14 is a double rod cylinder, the two annular chambers being connected via an operating line 26 and/or another operating line 28 to the two working ports A, B of the directional valve section 6.

In both directional valve sections 4, 6 a 4/3 directional valve 34 and 32, respectively, is provided which are biased into the shown locked position and by which the pressure fluid flow direction to and from the cylinders 12, 14 can be adjusted—as will be illustrated hereinafter.

The LUDV section 2 includes an LUDV valve 34 allocated to the two cylinders 12, 14 consisting of a metering orifice 36 and an LUDV pressure regulator 38 arranged downstream thereof. In such LUDV valves 34 the LUDV pressure regulator 38 is pressurized in the direction of its closing position by the maximum load pressure or a pressure approximately corresponding to the latter and in the opening direction by the pressure prevailing downstream of the respective metering orifice 36 connected upstream. In the shown embodiment the metering orifice 36 is in the form of a continuously variable 2/2 directional valve biased into its represented closing position. The metering orifice can be opened by supplying current to a proportional solenoid 40 for adjusting the pressure fluid volume flow to the loads 12, 14.

The pressure fluid volume flow to the lifting cylinder 10 is equally adjusted via an LUDV valve which hereinafter will be referred to as lifting LUDV valve 42. The basic structure thereof corresponds to that of the LUDV valve 34—thus it consists substantially of a lifting metering orifice 44 and a lifting LUDV pressure regulator 46 connected downstream thereof. The lifting metering orifice 44 equally is in the form of a continuously variable 2/2 directional valve the opening cross-section of which is in turn adjustable via a proportional solenoid 48. As will be explained in detail hereinafter, lifting of a load is performed by supplying pressure fluid to the bottom-side cylinder chamber 16 of the lifting cylinder 10. Lowering the load or the fork is solely performed by the weight force thereof, the lowering velocity being controlled by an LS valve 50. Such LS valve substantially consists of a continuously variable LS metering orifice 52 to which an LS pressure regulator 54 is allocated. The latter is arranged, in the shown embodiment, downstream of the LS metering orifice 52 and in the direction of its closing position the force of a spring is applied to it and in the direction of its closing position the force of a spring and the pressure downstream of the LS metering orifice and in the opening direction the pressure upstream of the LS metering orifice 52 is applied to it. In the shown embodiment the LS metering orifice 52 is a 2/2 directional seat valve permitting a leakage-free blocking of the operating line 18 in its shown blocking position. The LS metering orifice 52 can be adjusted manually or by means of a proportional solenoid 56. Further details of the described LS/LUDV valves are explained by way of FIG. 2.

The pressure port P of the mobile control block 1 is provided at the output port of an LS pump which may be a constant displacement pump, for instance. The flow rate of said constant displacement pump, which is not shown, is then adjusted via a bypass pressure regulator 58 to which in the opening direction the pump pressure and in the closing direction the maximum load pressure of all loads and the force of a pressure regulator spring is applied. In the regulating position of the bypass pressure regulator 58 the pump pressure is constantly adjusted to a pump A corresponding to the force of the spring above the maximum load pressure which is tapped in an LS line 60. So as to be able to relieve the LS line 60, it is connected to a discharge line 64 connected to the tank port T of the mobile control block 1 via a relief valve 62 in the form of a flow control valve. A very low control oil flow constantly passes through said relief valve 62 to the tank not shown. An LS pressure relief valve 66 is provided in the LS line 60 to ensure the pressure.

Figure 2:
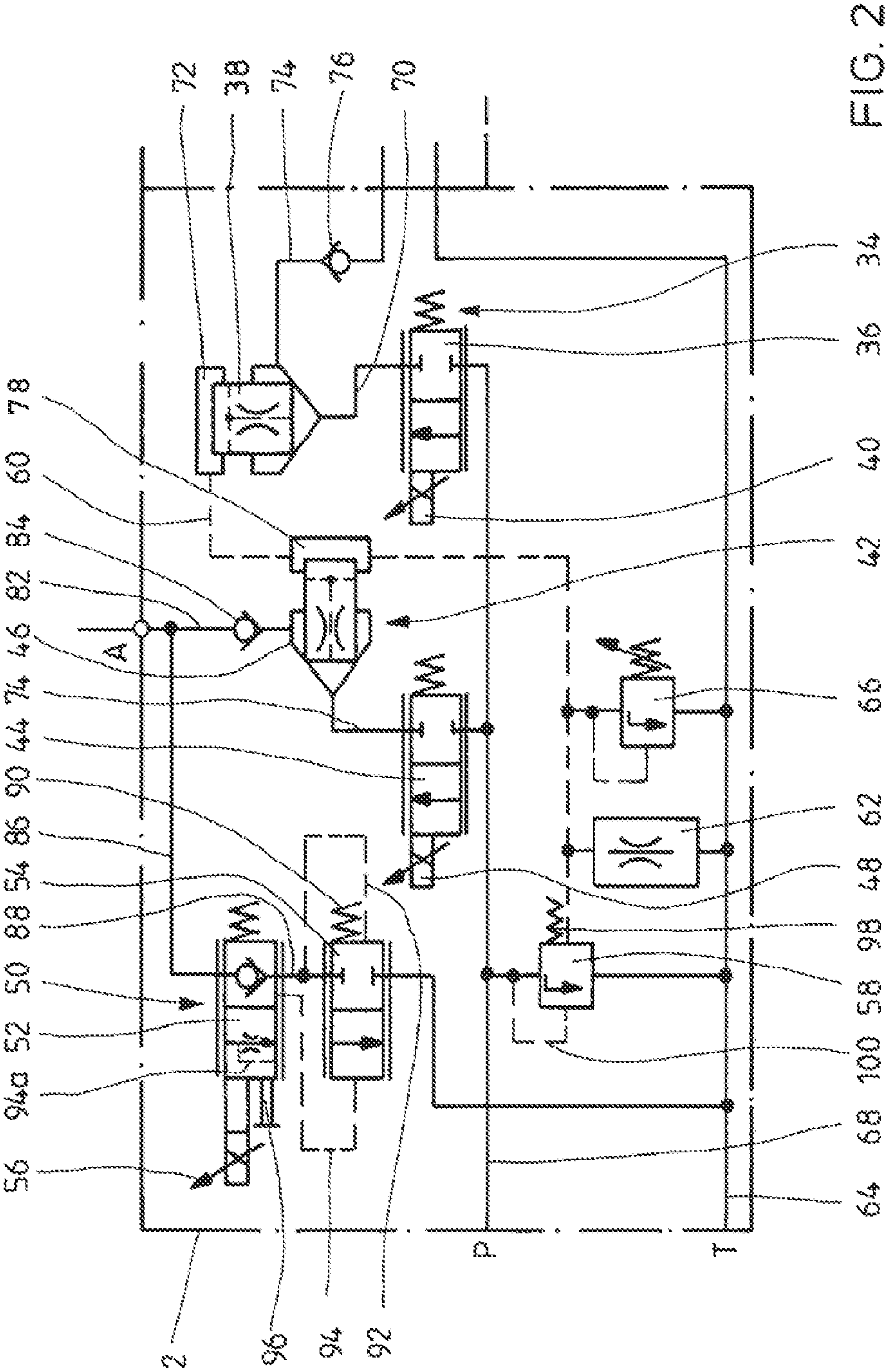
FIG. 2 is a detailed representation of the control arrangement shown in FIG. 1.

Further details of the LUDV section 2 are illustrated by way of the enlarged representation in FIG. 2.

The pressure fluid flows from the pressure port P via a feed passage 68 to the inlet port of the lifting metering orifice 44 and the LUDV metering orifice 36. The outlet port of the LUDV metering orifice 36 is connected to the inlet port of the LUDV pressure regulator 38 via a pressure regulator passage 70 so that the LUDV pressure regulator is pressurized in the opening direction by the pressure prevailing downstream of the LUDV metering orifice 36. As mentioned in the foregoing, said opening cross-section is adjusted by the proportional solenoid 40.

A rear control chamber 72 of the LUDV pressure regulator 38 is connected to the LS line 60 so that the pressure in the LS line 60 acts in the closing direction on the rear side of the pressure regulator piston. As there the maximum load pressure of all loads or at least a pressure corresponding thereto is applied, at the inlet of the LUDV pressure regulator 38 equally the maximum load pressure is adjusted in the regulating position. Said maximum load pressure is throttled via the LUDV pressure regulator 38 to the actual load pressure of the allocated load and is guided to the allocated load via the advance line 74 connected to the outlet port of the LUDV pressure regulator 38. In the advance line 74 a check valve 76 opening toward the two cylinders 12, 14 is disposed so that a pressure fluid backflow to the LUDV valve 34 is prevented. The pressure fluid displaced from the cylinders 12, 14 flows through the discharge passage 64 and the tank port T to the tank.

Basically, the lifting LUDV valve 42 has the same structure as the LUDV valve 34. The inlet of the lifting metering orifice 44 is connected to the feed passage 68 and the outlet is connected via a further pressure regulator passage 74 to the inlet of the lifting LUDV pressure regulator 46. The rear control chamber 78 thereof is equally connected to the LS line 60 so that the pressure regulator piston of the lifting LUDV pressure regulator 46 is pressurized in the closing direction by the maximum load pressure and in the opening direction by the pressure prevailing downstream of the lifting metering orifice 44. The latter is adjusted via the proportional solenoid 48. The outlet port of the lifting LUDV pressure regulator 46 is connected to the working port A via an advance passage 82 and a check valve 84 opening toward the working port A. In the area between the working port A and the check valve 84 a return passage 86, in which the LS valve 50 active in the lowering direction is arranged, branches off the advance passage 82.

The inlet of the LS feed metering orifice 52 is connected to the return passage 86. The outlet is connected, via a pressure regulator passage 88, to the inlet of the LS pressure regulator 54. The force of a spring 90 and the pressure at the outlet of the LS feed metering orifice 52 is applied in the closing direction to the pressure regulator piston thereof. This control pressure is tapped via a control passage 92 in the pressure regulator passage 88. In the opening direction the pressure upstream of the LS feed metering orifice 52 is active. This pressure is tapped via a control passage 94, wherein part of the control oil flow path, marked with **94*a* in FIG. 2, is integrated in the LS metering orifice 52. As explained already by way of FIG. 1, the opening cross-section of the LS metering orifice 52 is adjusted via the proportional solenoid 56 or manually via a handle 96**.

The pressure fluid volume flow being discharged from the lifting cylinder 10 is kept constant by the LS valve 50 independently of the load pressure. As already explained, the LS metering orifice 52 is a seat valve so that a leakage-free support of the lifting cylinder 10 is carried out in the shown closing position. For lowering the load the LS metering orifice 52 is opened, wherein the lowering velocity can be kept constant independently of the load pressure, as in the control position of the LS pressure regulator 54 a constant pressure difference corresponding to the force of the spring 90 is adjusted above the LS feed metering orifice 52.

As already mentioned, the force of a pressure regulator spring 98 and the pressure prevailing in the LS line are applied to the bypass pressure regulator 58 in the closing direction and the pressure prevailing in the feed passage 68 which is tapped via a passage 100 is applied in the opening direction. The relief valve 62 and the LS pressure limiting valve 66 each extend between the LS line 60 and the discharge passage 64.

The circuit shown in FIGS. 1 and 2 permits to simultaneously actuate, for instance, the lifting cylinder 16 and either the tilting cylinder 12 or the displacement cylinder 14.

As can be taken especially from FIG. 1, the two cylinders 12, 14 are connected in parallel, wherein it is provided that merely either of the two loads is connected. The directional valves 30, 32 arranged upstream of the two cylinders 12, 14 are 4/3 directional valves which are biased into their shown home position via a centering spring arrangement. Adjustment to the shift positions a, b is performed via solenoids. When changing the directional valve 30 into the shift position a, the advance passage 74 is connected to the working port A and the discharge line 64 is connected to the working port B. In this way the two tilting cylinder 12 are extended and the boom tilt is appropriately reduced. When changing the directional valve 32 to the shift position a, the displacement cylinder 14 is displaced to the right in accordance with the representation in FIG. 1.

When changing the directional valve 30 to the shift position b, the two working ports A, B of the cylinder 12 are connected to the advance passage 64 and to the advance passage 74 so that, for instance, the boom is tilted via the tilt cylinder 12, the tilting rate being defined by the lowering brake valve 24 provided in the return path.

If the directional valve 32 is changed to the shift position b, the displacement cylinder 14 is displaced to the left in the representation according to FIG. 1. As mentioned already before, either the displacement cylinder 14 or the tilting cylinder 12 is constantly actuated so that the respective load is supplied with pressure fluid by the LUDV valve 34.

When simultaneously actuating the lifting cylinder 10 and the tilting cylinder 12, the pressure fluid volume flow is kept constant via the LUDV valves 34 and 42 in response to the adjusted opening cross-section of the metering orifices 44 and 36, wherein even in the case of under-saturation the distribution of the pressure fluid volume flow remains constant independently of the load so that even then both loads 16, 12 or 14 can still be controlled in parallel. As described in the beginning, this is not possible in conventional control arrangements for forklifts.

Figure 3:
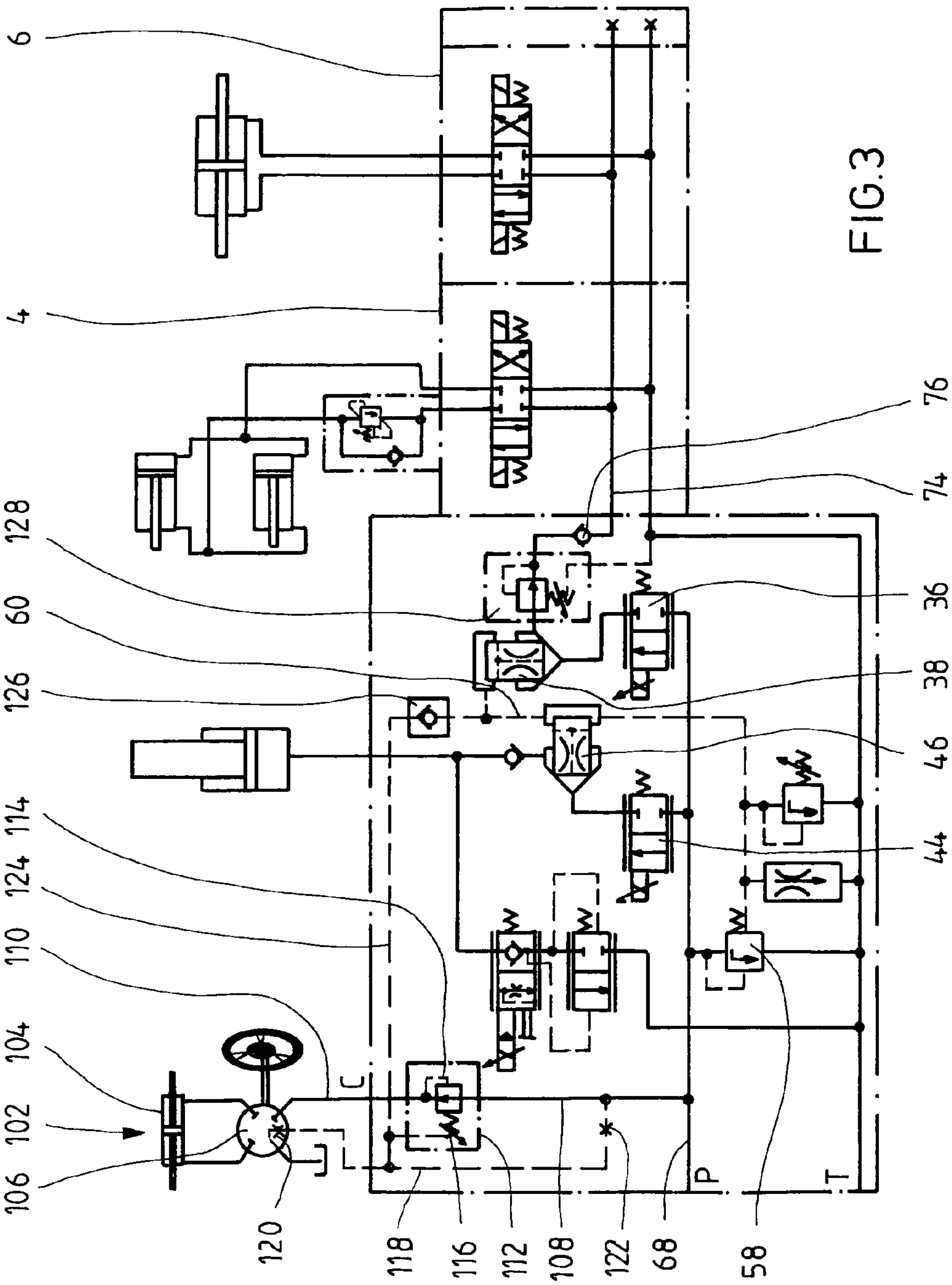
FIG. 3 shows the control arrangement according to FIG. 1 including an integrated LS steering and FIG. 4 is a variant of the circuit according to FIG. 3.

FIG. 3 shows an embodiment in which a steering 102 is integrated in the circuit according to the FIGS. 1 and 2. Such steering commonly comprises a steering cylinder 104 which for steering is supplied with pressure fluid via a steering unit 106. Those steering units 106, also referred to as steering orbitrol, are described in the data sheet RD 14 365 of Bosch Rexroth AG, for instance. The steering unit 106 substantially consists of a metering pump and a manually operated servo valve designed as rotary valve. The size of the metering pump is selected such that steering can be carried out by three to five rotations of the steering wheel from stop to stop of the steering. The steering unit 106 is supplied with pressure fluid via a steering line 108 branching off the feed passage 68 and being connected to the steering unit 106 via a steering port C and an operating line 110. In the steering line 108 a steering pressure regulator 112 is disposed which, jointly with the metering orifice integrated in the steering unit 106, forms an LS valve by which the pressure fluid volume flow can be kept constant for adjusting the steering cylinder 104 independently of the load.

The steering pressure regulator 112 is pressurized in the closing direction by the pressure upstream, i.e. by the pressure prevailing in the area of the port C. This control pressure is tapped via a steering control line 114. In the opening direction an adjustable pressure regulator spring 116 as well as a steering control pressure tapped at a control line 118 act upon the steering pressure regulator 112. The steering line 118 extends from the steering unit 106 to a portion of the steering line 108 located upstream of the steering pressure regulator 112. The load pressure of the steering can be tapped via said control line 118. In the shown embodiment two nozzles 120, 122 jointly forming a pressure divider are disposed in the control line 118. In the area between the two nozzles 120, 122 a control passage 124 which is also connected to a spring-side control chamber of the steering pressure regulator 112 branches off so that the pressure prevailing in the control passage 124 in the opening direction acts upon the piston of the steering pressure regulator 112. In the shown embodiment the control passage 124 is connected to the LS line 60 via a further check valve 126.

The lower nozzle 122 in FIG. 3 forms, jointly with the bypass pressure regulator 58 when the steering is actuated, a flow controller by which the control oil volume flow can be kept constant through the nozzle 122. By appropriately designing the further nozzle 120 in the area between the nozzles 120, 122 a predetermined pressure can be adjusted which exceeds the steering load pressure by a particular pressure difference. Such circuit ensures that in the case of under-saturation the steering 102 is supplied with pressure fluid, wherein no Δ is applied above the two metering orifices 36 and 44 of the LUDV loads 10, 12, 14, because when appropriately selecting the nozzle 120 at the inlet of the pertinent LUDV pressure regulator 38, 44 the same pressure is adjusted as in the control passage 124 and said pressure corresponds to the pump pressure when the nozzle is appropriately selected (nozzle 120) so that no pressure fluid or only a small volume flow passes to the other LUDV loads, while the steering remains fully operable, however.

It is another peculiarity of the embodiment shown in FIG. 3 that in the advance passage 74 a pressure relief valve 128 is provided through which a lower operating pressure can be adjusted in the directional valve sections 4, 6 than in the LUDV section 2. The pressure relief valve 128 is preferably arranged in the area between the LUDV pressure regulator 38 and the check valve 76.

Figure 4:
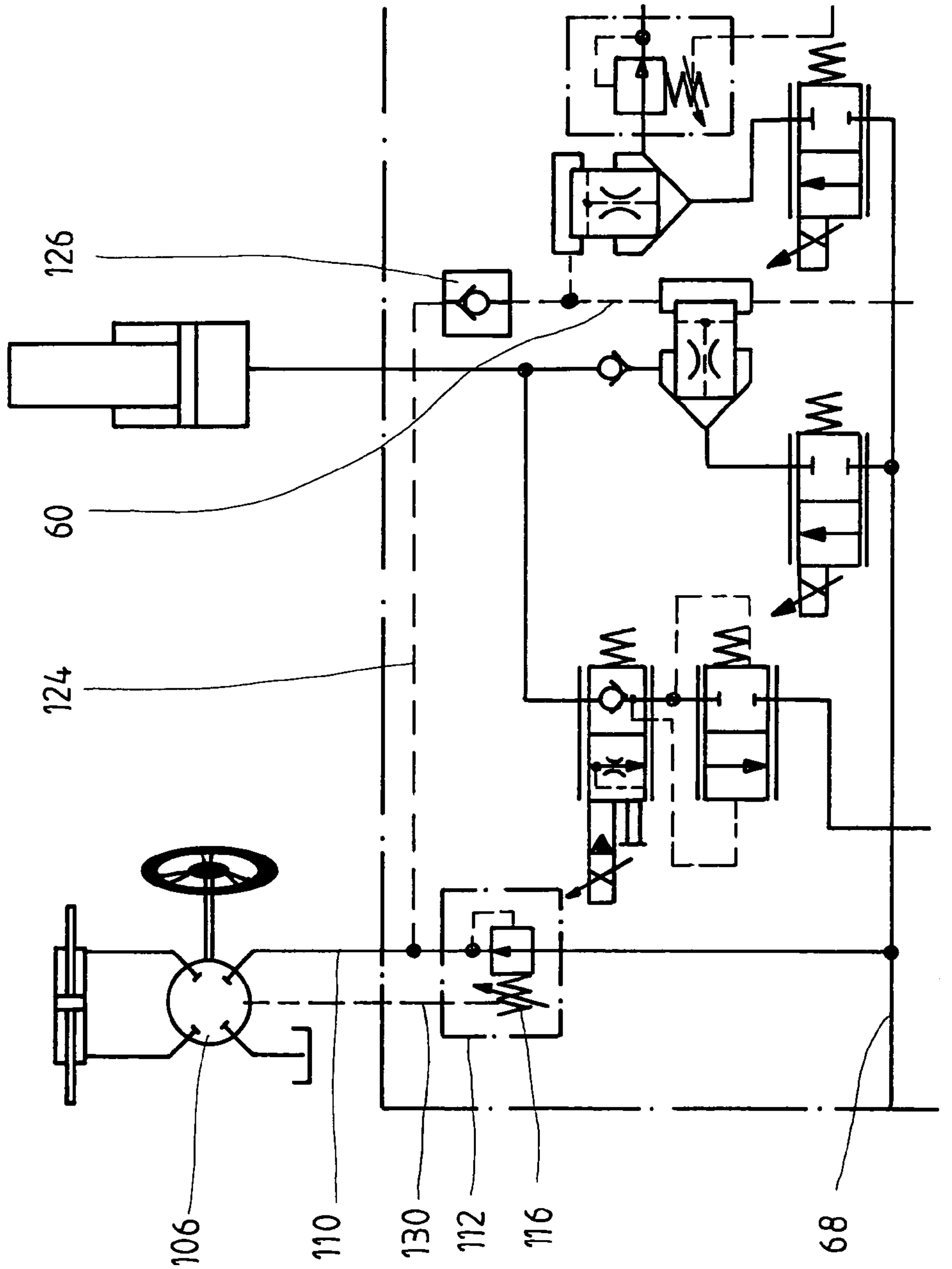

FIG. 4 illustrates another option of integrating the steering 102 into the circuit according to FIG. 1, wherein the differences between the embodiments of FIGS. 3 and 4 merely reside in tapping the load pressure acting upon the steering pressure regulator 112.

In the variant shown in FIG. 4 the load pressure of the steering unit 106 is tapped via a passage 130 which has, in contrast to the control line 118 of the afore-described embodiment, no connection to the steering line 108. The control passage 124 in this embodiment connects the LS line 60 to the operating line 110 so that the pressure downstream of the steering pressure regulator 112 is sensed to the LS line 60 via the check valve 126. Said pressure is higher than the load pressure of the steering. In the opening direction the pressure regulator spring 116 and the pressure prevailing in the passage 130 in turn act on the steering pressure regulator 112. Said pressure approximately corresponds to the load pressure of the steering (pressure downstream of the steering metering orifice).

In the case of under-saturation, i.e. when the pump is not adapted to convey sufficient pressure fluid, the pressure in the feed passage 68 drops and through the LUDV pressure regulators the respective load pressure of the LUDV loads is applied to the outlet of the inflow metering orifice so that accordingly the pressure difference above the LUDV metering orifices drops and less pressure fluid flows to the LUDV loads or the latter are no longer supplied with pressure fluid. The steering unit 106 is supplied with pressure fluid when the steering pressure regulator 112 is fully opened, however, so that the steering can continued to be actuated. Such integration of a steering in an LUDV control arrangement is known per se from DE 101 19 276 A1 so that further explanations can be dispensed with.

On principle, the afore-described control arrangements can also be employed in other mobile machines, such as wheel loaders, mini excavators etc.

The invention discloses a hydraulic control arrangement for a mobile machine, especially for a forklift, comprising at least two hydraulic loads, one of them having a lifting function. In accordance with the invention, the two loads are controlled each via an LUDV valve including inflow metering orifice and LUDV pressure regulator connected downstream.

LIST OF REFERENCE NUMERALS

1 control block
2 LUDV section
4 directional valve section
6 directional valve section
8 end plate
10 lifting cylinder
12 tilting cylinder
14 displacement cylinder
16 cylinder chamber
18 operating line
20 load line
22 further load line
24 lowering brake valve
26 operating line
28 operating line
30 directional valve
32 directional valve
34 LUDV valve
36 LUDV metering orifice
38 LUDV pressure regulator
40 proportional solenoid
42 lifting LUDV valve
44 lifting metering orifice
46 lifting LUDV pressure regulator
48 proportional solenoid
50 LS valve
52 LS metering orifice
54 LS pressure regulator
56 proportional solenoid
58 bypass pressure regulator
60 LS line
62 relief valve
64 discharge line
66 LS pressure limiting valve
68 feed passage
70 pressure regulator passage
72 control chamber
74 advance passage
76 check valve
78 control chamber
80 advance passage
82 advance passage
84 check valve
86 return passage
88 pressure regulator passage
90 spring
92 control passage
94 control passage
96 handle
98 pressure regulator spring
100 passage
102 steering
104 steering cylinder
106 steering unit
108 steering line
110 operating line
112 steering pressure regulator
114 steering control line
116 pressure regulator spring
118 control line
120 nozzle

122 nozzle
124 control passage
126 further check valve
128 pressure relief valve
130 passage

The invention claimed is:

1. A hydraulic control arrangement for a forklift comprising at least two hydraulic loads (10, 12, 14) which can be supplied with pressure fluid by a pump in response to a maximum load pressure, wherein one of the hydraulic loads (10, 12, 14) is a lifting cylinder (10) provided for lifting a load of the forklift and another one of the hydraulic loads (10, 12, 14) is a tilting cylinder (12) provided for tilting a boom of the forklift and another one of the hydraulic loads (10, 12, 14) is a displacement cylinder (14) for laterally displacing the boom, wherein a pressure fluid volume flow to the lifting cylinder (10) and a pressure fluid volume flow to at least one of the tilting cylinder (12) and the displacement cylinder (14) are each defined via a respective inflow metering orifice (36, 44) and a load-pressure independent flow distribution (LUDV) pressure regulator (38, 46) allocated thereto, which is pressurized in an opening direction by a pressure downstream of the allocated inflow metering orifice (36, 44) and in a closing direction by a pressure approximately corresponding to the maximum load pressure, characterized in that in a return line from the lifting cylinder (10), an LS valve (50) including an LS metering orifice (52) and an LS pressure regulator (54) is arranged for controlling lowering the load of the forklift, and wherein the tilting cylinder (12) and the displacement cylinder (14) are associated with a joint load-pressure independent flow distribution (LUDV) valve (34).

2. A hydraulic control arrangement according to claim 1, wherein the tilting cylinder (12) is controlled via a proportional valve.

3. A hydraulic control arrangement according to claim 1, wherein one of the inflow metering orifices (36) and a pertinent one of the LUDV pressure regulators (38) are allocated to at least two of the hydraulic loads (12, 14).

4. A hydraulic control arrangement according to claim 3, wherein a directional valve (30, 32) is allocated to at least one of the hydraulic loads (12, 14), the directional valve serving to adjust a pressure fluid flow direction to and from the at least one of the hydraulic loads (12, 14).

5. A hydraulic control arrangement according to claim 3, wherein a pressure reducing valve (128) is provided downstream of the LUDV pressure regulator (38).

6. A hydraulic control arrangement according to claim 1, wherein one of the inflow metering orifices (36, 44) is formed by a continuously variable two-way valve.

7. A hydraulic control arrangement according to claim 1, wherein downstream of the LUDV pressure regulator (46) of one of the hydraulic loads (10) a check valve (84) opening toward the latter is disposed and a return passage (86) branches off between the check valve (84) and the hydraulic load (10).

8. A hydraulic control arrangement according to claim 1 comprising a steering unit (106) having an LS inflow metering orifice for pressure fluid supply of an actuator (104) of the steering (102) and a steering pressure regulator (112) being allocated thereto.

9. A hydraulic control arrangement according to claim 8, wherein the steering pressure regulator (112) is pressurized, in the closing direction, by the pressure prevailing upstream of the LS inflow metering orifice of the steering unit (106) and in the opening direction by a spring (116) and the pressure prevailing in a control line (118, 130) connected to a line portion guiding the load pressure of the steering.

10. A hydraulic control arrangement according to claim 9, wherein a line portion located downstream of the steering pressure regulator (112) is connected, via a control passage (124) and a check valve (126) blocking in the direction of the steering unit (106), to an LS line (60) guiding the maximum load pressure of the hydraulic loads (10, 12, 14).

11. A hydraulic control arrangement according to claim 9, wherein the control line (118) leads from a pressure fluid flow path upstream of the steering pressure regulator (112) to a line portion guiding the load pressure of the steering, two nozzles (120, 122) being arranged in the control line (118), and in an area between the two nozzles (120, 122) a control passage (124) leading to a control chamber active in the opening direction of the steering pressure regulator (112) branches off which is connected to an LS line (60) guiding the maximum load pressure via a check valve (126).

12. A hydraulic control arrangement according to claim 10, wherein the LS line (60) is connected to a tank via a relief valve (62).

13. A hydraulic control arrangement according to claim 10, wherein the pressure prevailing in the LS line (60) is limited via a pressure limiting valve (66).

14. A hydraulic control arrangement according to claim 1, wherein the pump is a constant displacement pump to which a bypass pressure regulator (58) is allocated which is pressurized, in the opening direction, by the pump pressure and in the closing direction by the maximum load pressure prevailing in the LS line (60) and a pressure regulator spring.

15. A hydraulic control arrangement according to claim 11, wherein the LS line (60) is connected to a tank via a relief valve (62).

16. A hydraulic control arrangement according to claim 11, wherein the pressure prevailing in the LS line (60) is limited via a pressure limiting valve (66).

* * * * *